United States Patent [19]

Luitwieler et al.

[11] 4,060,726
[45] Nov. 29, 1977

[54] GAMMA COUNTER CALIBRATION SYSTEM

[75] Inventors: Samuel H. Luitwieler, La Mirada; Donald L. Horrocks, Placentia, both of Calif.

[73] Assignee: Beckman Instruments, Inc., Fullerton, Calif.

[21] Appl. No.: 733,605

[22] Filed: Oct. 18, 1976

[51] Int. Cl.² .............................................. G01D 18/00
[52] U.S. Cl. ..................................... 250/252; 250/328; 250/363 R
[58] Field of Search ................. 250/252, 363, 369, 328

[56] References Cited

U.S. PATENT DOCUMENTS

3,390,269  6/1968  Packard ............................... 250/328

Primary Examiner—Davis L. Willis
Attorney, Agent, or Firm—Robert J. Steinmeyer; Robert R. Meads

[57] ABSTRACT

A method and apparatus for the calibration of a gamma radiation measurement instrument to be used over any of a number of different absolute energy ranges. The method includes the steps of adjusting the overall signal gain associated with pulses which are derived from detected gamma rays, until the instrument is calibrated for a particular absolute energy range; then storing parameter settings corresponding to the adjusted overall signal gain, and repeating the process for other desired absolute energy ranges. The stored settings can be subsequently retrieved and reapplied so that test measurements can be made using a selected one of the absolute energy ranges. Means are provided for adjusting the overall signal gain by varying the voltage supplied to a multiplier phototube included in the instrument, or by varying the gain of attenuators coupled to the output of the phototube. A specific technique is disclosed for making coarse, then fine adjustments to the signal gain, for rapid convergence on the required calibration settings.

10 Claims, 11 Drawing Figures

GAMMA COUNTER CALIBRATION SYSTEM

BACKGROUND OF THE INVENTION

The present invention relates generally to gamma counters, i.e., instruments for the detection and measurement of gamma radiation. More particularly, the invention relates to a novel calibration technique for use with such instruments.

Typically, a gamma counter includes a radiation detector in the form of a sodium iodide crystal activated with thallium. Gamma rays emitted from a radioactive sample being monitored excite some of the electrons in the sodium iodide, and the excited electrons react with the thallium to produce light scintillations. The scintillations are then detected by a multiplier phototube and converted into corresponding electrical pulses. The resultant output pulses from the multiplier phototube should be directly proportional, in amplitude, to the energies of corresponding gamma rays from which the pulses were derived. Gamma counters usually include some means for sorting or filtering the output pulses from the phototube, so that an energy or pulse-height spectrum can be obtained.

By way of background, it should be noted that the energy spectrum that can be obtained by use of a gamma counter does not accurately reflect the energy spectrum of the incident radiation. Gamma rays are essentially monoenergetic, i.e., if a radioactive substance has the characteristic that it emits gamma rays at a particular energy level, every gamma ray from the substance will be emitted at exactly the same energy level. If an energy spectrum relating to the gamma radiation were to be plotted, with a count of detected gamma rays plotted along the vertical axis and the gamma ray energy plotted along the horizontal axis, the resulting spectrum would be a vertical line located at the energy level corresponding to the gamma radiation from the radioactive substance or would be a number of such vertical lines, if the substance emits gamma radiation at a number of different energy levels. In practice, however, such a spectrum can never be obtained from a gamma counter. The sodium iodide scintillator does not always generate exactly the same number of excited electrons from each incident gamma ray, and the multiplier phototube does not always produce exactly the same amplification each time a scintillation is detected by its photocathode. Consequently, the energy or pulse-height spectrum relating to output from the multiplier phototube will consist of a bell-shaped gaussian distribution, rather than a vertical line in the spectrum corresponding to the energy level of the incident gamma rays. This distribution is usually referred to as a photopeak in the pulse-height spectrum.

Most gamma counters include one or more pulse-height analyzers connected to receive output pulses from the multiplier phototube. Each pulse-height analyzer has upper and lower discriminator limits or settings which can be adjusted to define a desired "window" in the pulse-height spectrum. The pulse-height analyzer acts essentially as a filter, rejecting pulses which fall outside of the selected discriminator settings, and passing pulses which fall within the window to a scaler or counting device. The discriminator settings on a pulse-height analyzer are usually defined over an arbitrary scale, for example, between 0 and 1000. For many applications of a gamma counter, however, it is important to be able to obtain the results in terms of absolute energy levels. It is important, then, to be able to calibrate the gamma counter so that the relative range of the discriminator settings, from 0 to 1000, can be related to an absolute energy range, usually measured in millions of electron volts (MeV) or thousands of electron volts (KeV).

Ideally, a gamma counter should have a number of different energy ranges over which gamma radiation may be measured. For example, the relative scale of 0 to 1000 may correspond to an energy range of 0–0.5 MeV for one particular test, but may correspond to energy ranges of 0–1.0 MeV or 0–2.0 MeV for other tests using the same instrument. Prior to this invention, gamma counters have been calibrated for one particular energy range, usually the lowest energy range, then other energy ranges were obtained by the use of precision attenuators to reduce the pulse heights by an appropriate factor. For example, a gamma counter could be calibrated for a 0–0.5 MeV range by measuring the radiation from a calibration source known to emit gamma rays at a 0.25 MeV energy level. The attenuators would then be adjusted until the photopeak resulting from radiation from the calibration source was aligned with the 500th discriminator level setting, i.e., exactly of half-scale. The full-scale reading would then be 0.5 MeV, as desired. To obtain an energy range of 0–1.0 MeV, the attenuators would be adjusted to provide an additional attenuation factor of two, thereby halving the amplitude of all of the output pulses and providing an absolute energy range of 0–1.0 MeV. Similarly, to provide an absolute energy range of 0–2.0 MeV, a further attenuation factor of two would be interposed, again halving the amplitude of all of the peaks output from the multiplier phototube, and providing the desired energy range. The multiplier phototube would, in all instances, be operated at or near its maximum operating voltage.

It will be appreciated that any error in the calibration of the lowest range, 0–0.5 MeV in the foregoing example, will be magnified when the instrument is used on its higher ranges. Accordingly, there is a need in the field of gamma radiation measurement for a calibration technique which provides for the accurate calibration of the instrument for a number of different energy ranges, wherein the calibration at any one energy range is independent of the calibrations of the other energy ranges. The present invention fulfills this need.

SUMMARY OF THE INVENTION

The present invention resides in a method, and corresponding apparatus, for the calibration of a gamma counter operable to measure radiation over a plurality of absolute energy ranges, the calibration for any one energy range being independent of the calibrations for the other energy ranges. Briefly, and in general terms, the method of the invention includes the steps of placing a calibration source in an operative relationship with the detector of the instrument, the calibration source being an emitter of gamma rays of a known energy level, and adjusting the overall signal gain provided by the multiplier phototube until the pulses received by the pulse-height analyzer have a detectable height which bears the same ratio to a maximum detectable pulse height as the known energy level bears to a desired maximum energy level. The method further includes the steps of storing the adjustment settings obtained at the conclusion of the adjusting step, and repeating the adjusting and storing steps for other desired maximum detectable energy levels, whereby each setting obtained may be later retrieved and again applied to select any of a plurality of desired detectable energy ranges.

In a presently preferred embodiment of the invention, the overall signal gain of the multiplier phototube is adjusted by varying the high voltage supplied to the tube. However, the gain may also be varied by adjusting the gain of attenuators connected to receive output pulses from the multiplier phototube, or by a combination of both voltage and attenuator adjustments. In any event, the overall signal gain is adjusted until the photopeak resulting from radiation from the calibration source is centered at a discriminator setting corresponding to the known energy level of the calibration source as measured over the desired energy range. This discriminator setting for pulses of the known energy level is computed by multiplying the maximum relative pulse height, i.e., the full-scale discriminator setting, by the ratio of the known energy level to the desired maximum detectable energy level.

In accordance with one aspect of the invention, the step of adjusting the gain of the multiplier phototube includes first setting the gain of the tube to a minimum value, then increasing the gain until the photopeak corresponding to emissions from the calibration source is centered at the desired relative pulse height, as computed in the aforedescribed manner. To facilitate this adjustment process, it has been found to be desirable to increase the gain by relatively large steps, i.e., a coarse adjustment, until the peak approaches the desired relative pulse height, and then to increase the gain by relatively small steps, i.e., a fine adjustment, until the exact center of the photopeak is located at the desired relative pulse height.

More specifically, these steps of coarse and then fine adjustment are performed by setting a first discriminator window between a relatively low value and the desired relative pulse height, and a second discriminator window contiguous with the first, from the desired relative pulse height to the maximum available relative pulse height; then measuring the radiation falling within the two windows while the gain is successively increased by relatively large increments. This procedure is continued until the ratio of the number of counts detected in the second window to the number of counts detected in the first window reaches a preselected threshold value. When this occurs, a discriminator window is set with upper and lower limits relatively narrowly and equidistantly spaced above and below the desired relative discriminator setting. Measurements are then taken after making gain adjustments by relatively small increments, until a maximum is detected, this being the desired condition at which the photopeak is centered on the desired relative pulse height setting. At this point, the voltage setting or the attenuator setting, or both, can be stored or saved, to be later retrieved and reapplied to the multiplier phototube and attenuator, when the desired energy range is required for particular test measurements using the instrument.

There may also be included a preliminary coarse adjustment step in which a counting channel is set to monitor pulses of any height, and the phototube voltage is adjusted by relatively large increments until a threshold number of counts per minute is detected.

The novel apparatus of the invention includes means for varying the voltage applied to the multiplier phototube, and thereby varying the overall signal gain and moving the photopeak resulting from radiation from the calibration source along the relative energy level scale of the pulse-height spectrum. The apparatus includes means for storing the voltage settings and means for retrieving and reapplying the settings for a selected energy range. Adjustable attenuator means may also be included, to be used either separately or in conjunction with the means for varying the voltage, to adjust the overall signal gain.

It will be apparent from the foregoing that the present invention represents a significant advance in the field of gamma radiation measurement. In particular, it provides a hitherto unknown technique for calibrating a gamma counter for ultimate use over any of a number of different absolute energy ranges. Other aspects and advantages of the invention will become apparent from the following more detailed description, taken in conjunction with the accompanying drawings.

DETAILED DESCRIPTION

Figure 1:
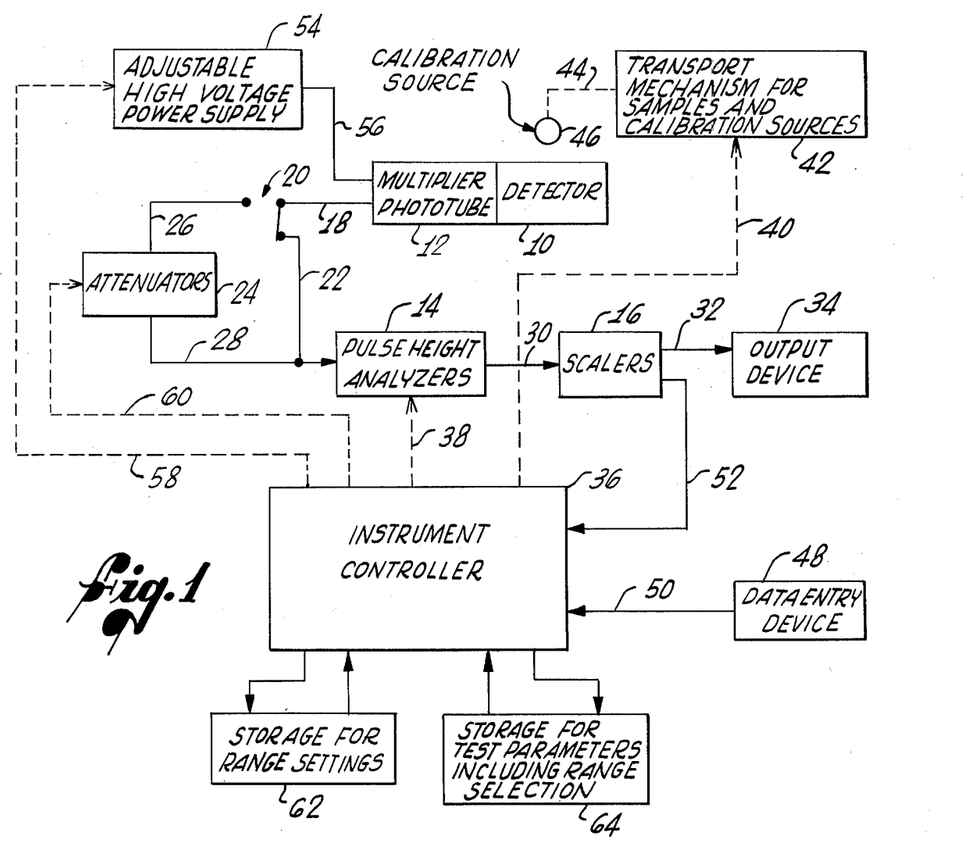
FIG. 1 is a block diagram of the apparatus of the present invention.

As shown in the drawings for purposes of illustration, the present invention is principally concerned with a novel technique for calibrating gamma counters. In particular it provides for accurate calibration over a number of different energy ranges, the calibration for any one energy range being independent of the calibrations for the other energy ranges. As shown in FIG. 1, a typical gamma counter includes a detector, indicated by reference numeral 10, an associated multiplier phototube 12, one or more pulse-height analyzers 14, and a corresponding number of scalers 16. The detector 10 usually takes the form of a sodium iodide crystal activated with thallium, which generates light scintillations in response to incident gamma radiation.

Located in proximity to the detector 10 is the multiplier phototube 12, which converts the scintillations from the detector into corresponding electrical pulses for output over line 18 to the pulse-height analyzers 14. The electrical pulses on line 18 may be transmitted directly to the pulse-height analyzers 14, as indicated by the illustrated position of a switch 20 to which the line 18 is connected, and by another line 22 from the switch to the pulse-height analyzers. Alternatively, the electrical pulses on line 18 may be transmitted through the switch 20 in its other position, through one or more precision attenuators 24 connected to the switch by line 26, and thence to the pulse-height analyzers 14 by line 28.

The pulse-height analyzers 14 operate essentially as amplitude filters, each analyzer having upper and lower discriminator limits which provide for the rejection of pulses falling outside of a given pulse-height or energy range. Typically, the upper and lower discriminator settings can be varied over an arbitrary scale, for example, from 0 to 1000. The outputs from the pulse-height analyzers 14, on line 30, represent counts of pulses falling within one or more selected relative energy ranges, and the scalers 16 are counting devices, as conventionally employed in instruments for radiation measurement. The outputs from the scalers 16 are connected, as indicated by line 32, to an output device 34, which may be any type of printing or display device.

The gamma counting instrument as described thus far is conventional in the field of radiation measurement, and may be operated manually, either for calibration or for taking test measurements. In manual operation, the upper and lower discriminator limits of the pulse-height analyzers 14 are set before placing a radioactive sample for calibration source in proximity to the detector 10. Then, the scalers 16 and output device 34 are monitored to obtain the desired counting results. Although the method of the present invention may be applied to such a manually operated instrument, it is more usefully employed with a more complex instrument of the type which is operated automatically under the direction of an instrument controller 36. The controller 36 may take the form of a hard-wired electronic device, or a specially designed microprocessor or minicomputer.

The controller 36 makes selections of upper and lower discriminator limits for the pulse-height analyzers 14, as indicated by the broken line 38, and also controls, as indicated by the broken line 40, a transport mechanism 42 which moves a succession of radioactive samples and calibration sources into operative relationship with the detector 10. This is shown only diagrammatically by the broken line 44 connecting the transport mechanism 42 with a calibration source, indicated by the circle 46.

The instrument controller 36 is also connected to receive control signals and data from a data-entry device 48, over line 50. A particular test using the instrument may be initiated by means of the data-entry device 48, or by other means, such as coded markers (not shown) placed in sequence before one or more samples to be measured, or before calibration sources to be moved into the instrument. Test parameters, such as the discriminator settings for the pulse-height analyzers 14, can be pre-stored within the instrument controller 36, and need not be entered through the data-entry device 48 on each occasion that a particular test run is to be performed. Once a test run is initiated, it can then proceed to completion automatically, with the output data from the scalers 16 being also made available to the instrument controller 36, over line 52. The pulse-height information derived from the pulse-height analyzers 14 provides a set of counts for selected pre-defined relative energy-range "windows", each window being measured between two points on a scale between 0 and 1000. For many applications of a gamma counter, it is important to be able to translate the relative energy levels of the discriminator settings to absolute energy levels, so that the scale from 0 to 1000 can be equated to a corresponding absolute energy range.

In accordance with the present invention, the amplitudes of pulses obtained from the multiplier phototube 12 and applied to the pulse-height analyzers 14 are adjusted, while the calibration source 46 is in an operative position in relation to the detector 10, until the instrument is correctly calibrated for a particular desired absolute energy range. Then, the settings or parameters of this adjustment are stored, and can be retrieved at a later time when the same desired energy range is again required. The process is repeated for other desired energy ranges, the calibration for each range being independent of the others.

In the embodiment illustrated, the amplitude adjustment of the output pulses is made by means of an adjustable high-voltage power supply 54, which supplies power to the multiplier phototube 12 over line 56, and, alternatively, by adjustment of the precision attenuators 24. These adjustments can be effected by the instrument controller 36, as indicated by lines 58 and 60 respectively. The instrument controller 36 communicates with a segment of storage 62 in which the range settings applied over lines 58 and 60 are stored. The storage 62 in which the settings are held may take any convenient form of read-write memory. If the invention is practiced on a manual instrument, without a controller 36, the settings can be stored as positions or connections of an impedance network, or as potentiometer settings.

Adjustment of the high-voltage power supply 54 varies the overall gain of the multiplier phototube 12 and effects the desired amplitude adjustment of the pulses output from the tube. In making the adjustment to the high-voltage power supply 54, it is not necessary that the voltage on line 56 be known in absolute terms, or that there be a linear relationship between the relative setting applied to line 58 and the resultant voltage on line 56. As will be explained, the desired high voltage setting is obtained by monitoring the output of the pulse-height analyzers 14. So long as a given setting on line 58 results in a reproducibly constant voltage on line 56, any nonlinearity of the high-voltage power supply 54 is of no consequence.

The instrument controller 36 also maintains communication with a second storage segment 64 for the storage of test parameters, including a range selection parameter, all of which can be input from the data-entry device 48.

Figure 2:
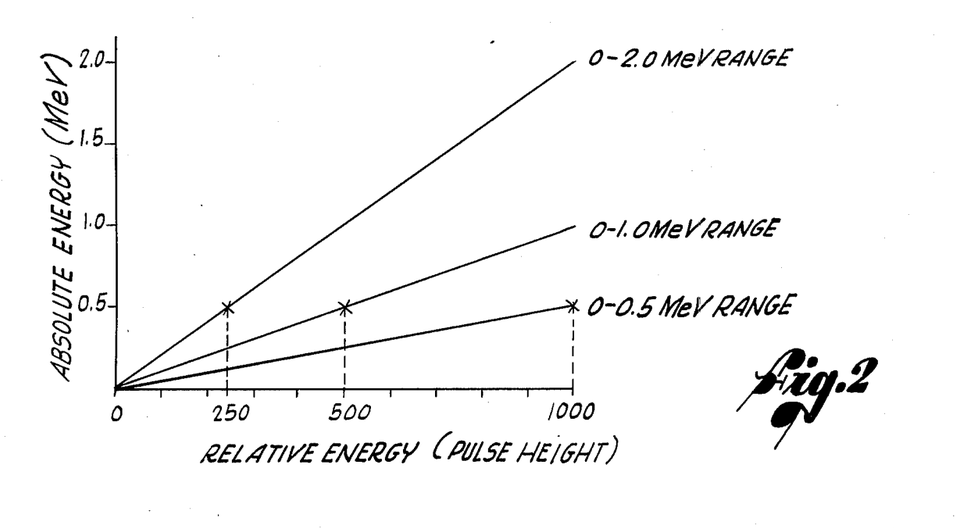
FIG. 2 is a set of three curves plotting the respective calibration relationships between relative energy level and absolute energy level for three different absolute energy ranges.

FIG. 2 illustrates three calibration relationships between a relative energy range, from 0 to 1000 on an arbitrary scale, and an absolute energy range measured in millions of electron volts (MeV). In this theoretical example, it is supposed that there is available a calibration source producing gamma radiation at an energy level of 0.5 MeV. As has been explained, although this radiation would be mono-energetic, with each gamma ray having exactly the same energy level, a pulse-height or energy spectrum produced from a gamma counter would result in a bell-shaped photopeak centered at the 0.5 MeV level. If this photopeak were to be centered at 1000 divisions, or the full-scale level, on a relative energy scale, the instrument would then be calibrated to read 0–0.5 MeV. Likewise, if the 0.5 MeV photopeak were to be centered at 500 divisions, or half-scale, the instrument would be calibrated to read over a 0–1.0 MeV range. Similarly, if the photopeak were to be centered at 250 divisions, or one-quarter scale, the instrument would be calibrated on a 0–2.0 MeV range.

Although it would be possible to use a different calibration source for each energy range, clearly it would be more convenient to utilize a single calibration source which gives a characteristic response falling totally within each of the desired energy ranges. Of course, the choice of a calibration source will depend upon the particular absolute energy ranges for which the instrument is to be calibrated, but some desirable features of the sources can be specified. First, the source should have a relatively long half-life, so that constant counting statistics can be maintained over the expected lifetime of the associated instrument. The source should also have a characteristic gamma radiation response which is not masked by other radiations from the same source. If an instrument has the three energy ranges 0–2.0 MeV, 0–1.0 MeV and 0–0.5 MeV, one radionuclide which meets these requirements is Barium-133, which has a 7.2 year half-life and emits gamma radiation at a 0.356 MeV energy level. All other gamma rays emitted by Barium-133 are of lower energy, and, as will shortly be seen, do not interfere with measurements of the photopeak response at 0.356 MeV. Moreover, the 0.356 MeV photopeak is within all three energy ranges, as is shown in FIGS. 3a–3c.

Figure 3A:
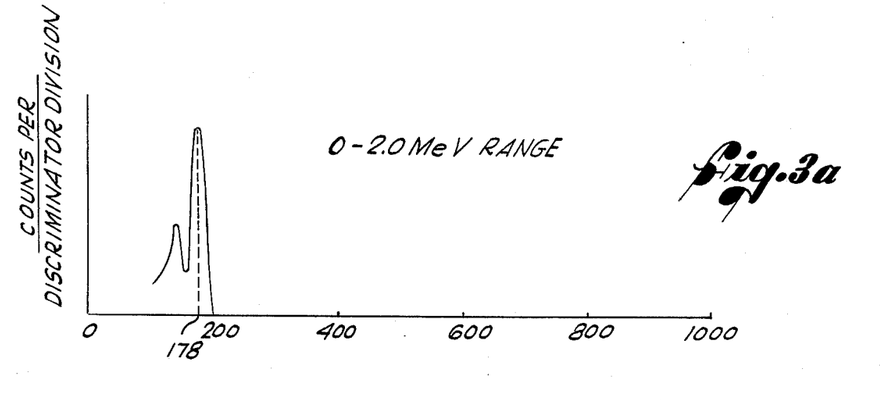
FIGS. 3a–3c are three pulse-height spectra all derived from the same calibration source, and resulting from three different gain factors of the multiplier phototube, corresponding to three different absolute energy ranges.
Figure 3B:
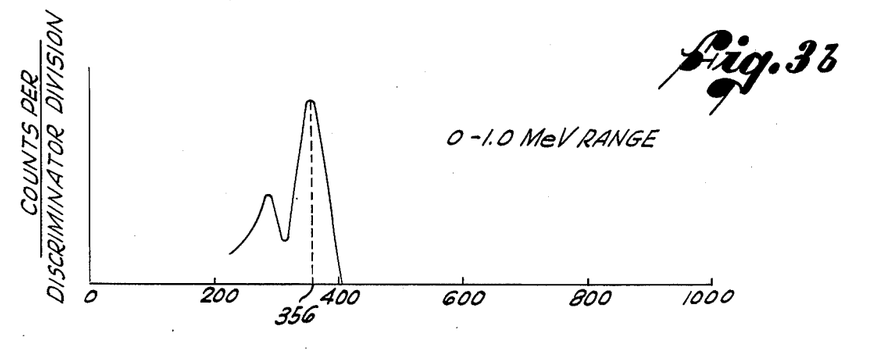
Figure 3C:
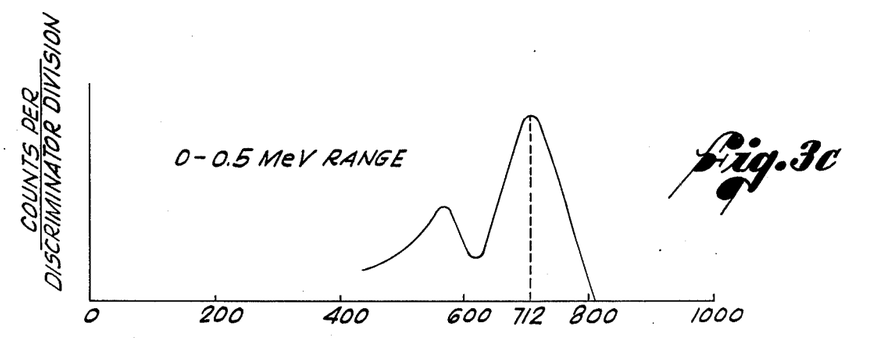

In FIGS. 3a–3c, the horizontal scale measures peak height on a relative scale from 0 to 1000, and the vertical scale provides a measure of counts per division of the horizontal scale. In FIG. 3b, the gain of the multiplier phototube, and possibly the gain of the attenuators, have been adjusted until the 0.356 MeV photopeak from the calibration source is centered over a discriminator level of 356 divisions on the horizontal scale. It will be apparent that, since a reading of 356 divisions on the horizontal scale in FIG. 3b corresponds exactly to the 0.356 MeV photopeak, a full-scale reading on the horizontal scale corresponds to 1.0 MeV.

In FIG. 3a, the gain has been adjusted to position the 0.356 MeV photopeak over a reading of 178 divisions on the horizontal scale. It will be apparent that, in FIG. 3a, one division on the horizontal scale corresponds to an energy increment of 0.002 MeV, and that the full-scale reading is equivalent to 2.0 MeV.

In similar fashion, FIG. 3c shows the spectrum from the same calibration source, but with the photopeak centered over a reading of 712 divisions on the horizontal scale. It will be apparent that, in FIG. 3c, one division on the horizontal scale corresponds to an energy increment of 0.0005 MeV, and that the full-scale reading is 0.5 MeV.

Figure 4A:
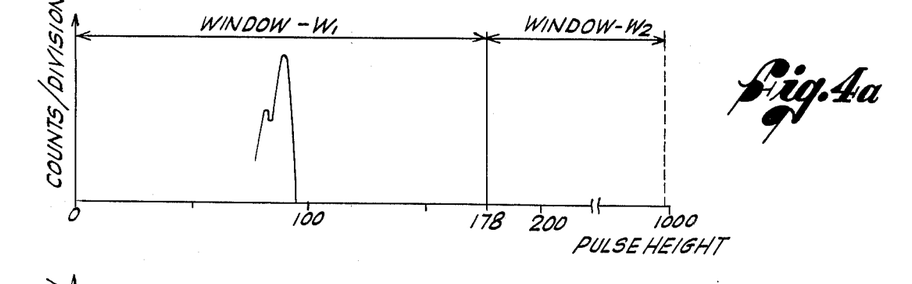
FIGS. 4a–4e are pulse-height spectra which together illustrate the process of adjustment of multiplier phototube gain to center the photopeak resulting from radiation from the calibration source over a desired relative pulse-height setting, thereby calibrating the instrument for a particular absolute energy range.
Figure 4B:
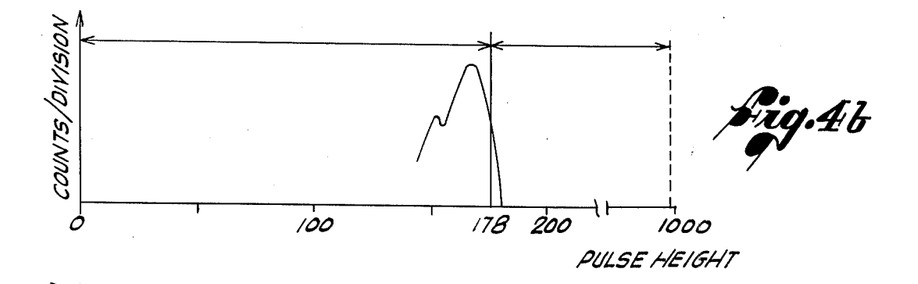
Figure 4C:
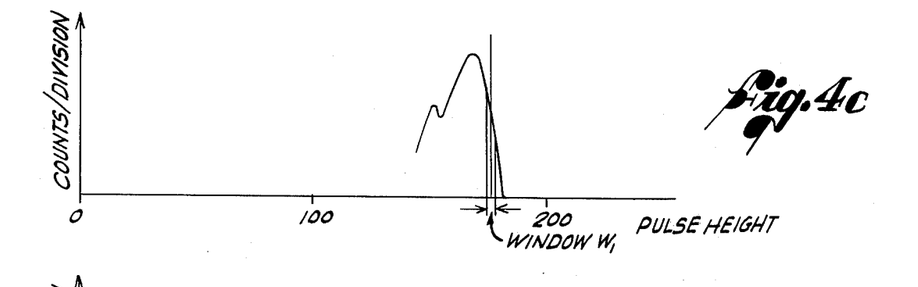
Figure 4D:
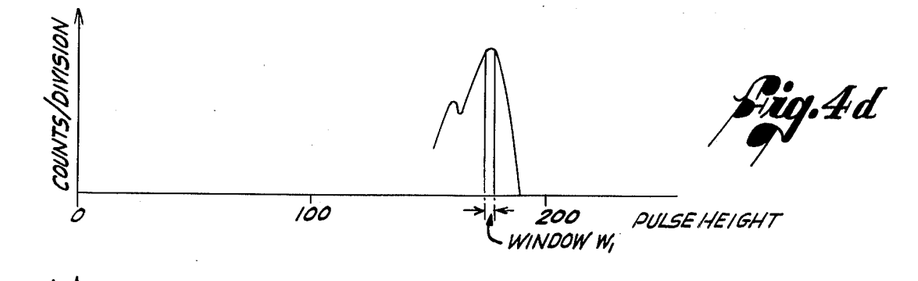
Figure 4E:
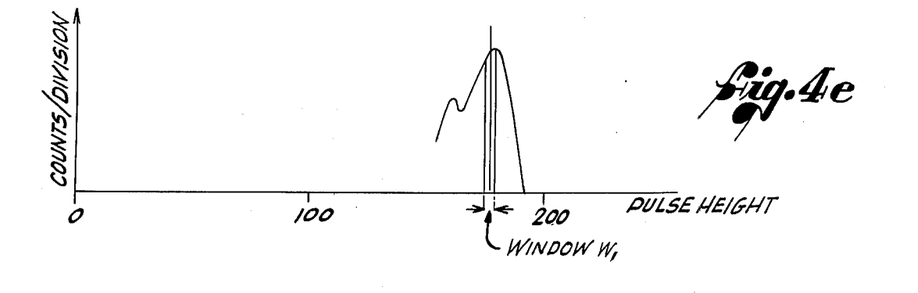

An important aspect of the present invention lies in the technique employed to adjust the gain of the multiplier phototube 12, (FIG. 1), or the gain of the attenuators 24 (FIG. 1), in order to effectively move the photopeak resulting from the radiation from the calibration source, and to center it over the desired relative energy level, as illustrated in FIGS. 3a–3c. In general, the technique includes an initial coarse adjustment of the gain, whereby the gain is increased by relatively large increments from a minimum level until the photopeak is positioned on the low side of the desired relative energy level on which it is to be centered. FIG. 4a shows the photopeak in an on-scale position, but substantially spaced below the desired relative energy level of 178 divisions. FIG. 4b shows the same photopeak after the coarse adjustment, with the photopeak positioned with its front slope, i.e. at the high energy side of the photopeak, aligned with the desired relative energy level. Thereafter, the gain is increased in smaller increments until the photopeak is accurately located above the desired relative energy level. This step of fine adjustment of the gain is illustrated in FIGS. 4c–4e, which will be described in conjunction with the flow chart in FIG. 5.

Figure 5:
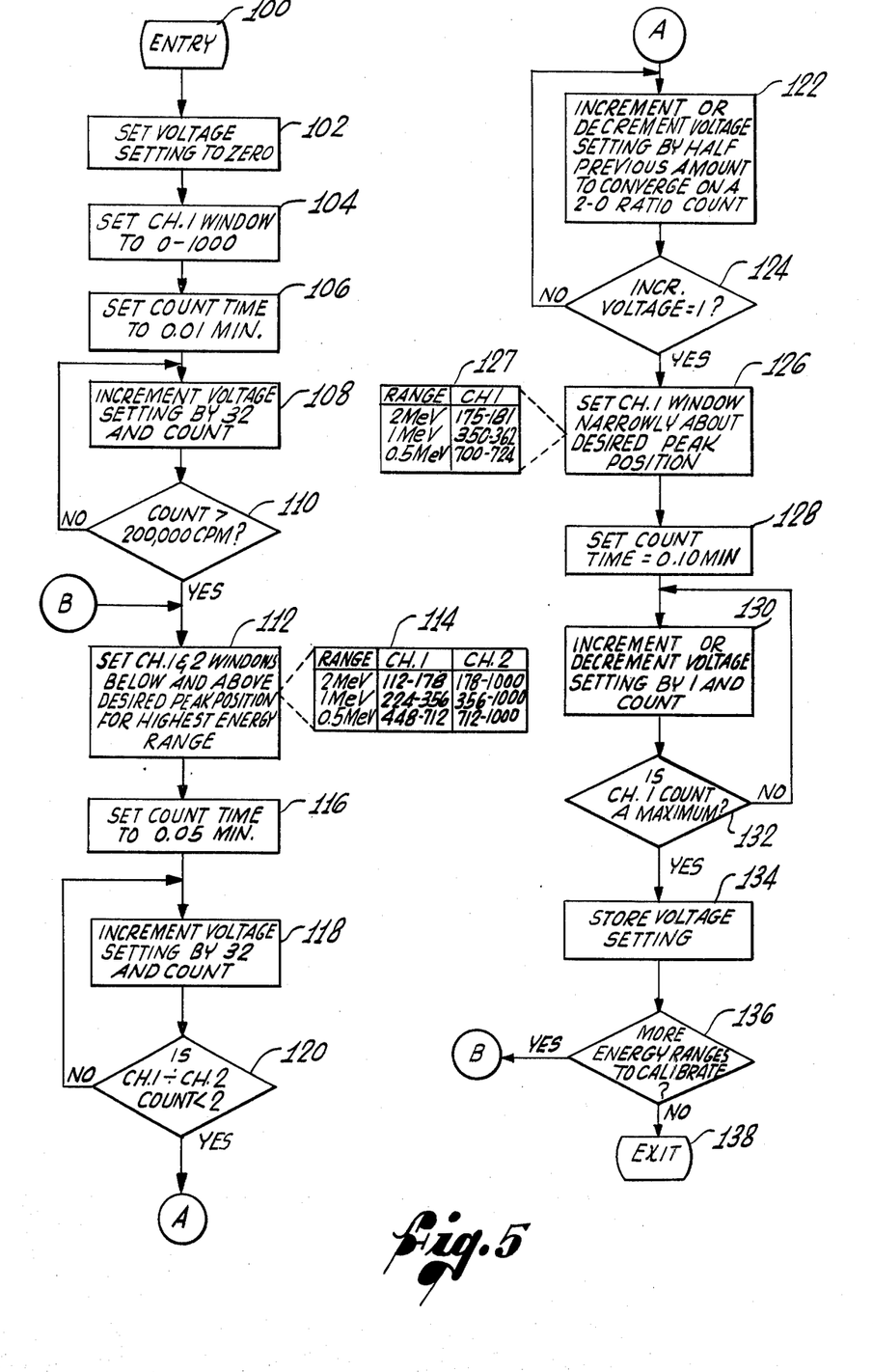
FIG. 5 is a flow-chart showing the functional steps to be performed in calibrating a gamma counter in accordance with the method of the present invention.

The flow chart of FIG. 5 illustrates the functions which are performed by the instrument controller 36 (FIG. 1) in calibrating the gamma counter. It will be appreciated that, although these steps can be accomplished most efficiently by means of a programmed microprocessor or minicomputer, the same steps could be performed by manual adjustments of gain, and manual observations of counts recorded by the scalers 16 (FIG. 1).

Beginning at the "entry" point 100, the voltage setting applied to the adjustable high-voltage power supply 54 (FIG. 1) is set to a zero value, as shown in block 102. It should be understood that this is not representative of a zero voltage level, but only of a zero setting in an arbitrary range from zero to some higher value, in this case 1023. The zero output setting corresponds to some minimum operating voltage of the multiplier phototube 12 (FIG. 1), and in general there will be no linear relationship between the output setting and the actual voltage applied to the phototube.

The flow chart of FIG. 5 is applicable to an instrument which has at least two counting channels, i.e., at least two pulse-height analyzers 14 (FIG. 1) and two scalers 16 (FIG. 1). In the next step shown at block 104, a counting channel designated as channel 1 is set to have its counting window wide open, i.e., with its lower discriminator limit at 0 and its upper discriminator limit at 1000 on the arbitrary relative energy scale of 0 to 1000. Then, in block 106 the counting time for the instrument is set at 0.01 minute, and, as shown in block 108, a count is taken for the designated counting time after first incrementing the voltage output setting by thirty-two. This is a relatively coarse increment of voltage, corresponding approximately to between ten and fifteen volts. Next, the the question is asked, in block 110, whether the count rate exceeds 200,000 counts per minute. If the answer is negative, return is made to block 108 to increment the voltage setting by thirty-two again, and to count once more for 0.01 minute. The purpose of these steps is to ensure that the gain of the phototube 12 (FIG. 1) is sufficiently high to register a substantial number of counts per minute in the instrument. This can be accomplished relatively quickly with a relatively small counting time for each step.

Once the count rate has reached a substantially high value, as determined in block 110, the next step, as indicated in block 112, is to set the discriminator limits of channel 1 and a second channel, designated channel 2, to cover two windows above and below the desired relative energy position over which the photopeak is to be centered for the highest of the desired energy ranges. It will be apparent from FIGS. 3a–3c that the highest energy range, in this case 0–2.0 MeV, will require the photopeak to be centered at a relatively low relative energy level. The next highest range, in this case 0–1.0 MeV, requires the photopeak to be centered at a higher relative energy level than for the 0–2.0 MeV range, i.e., at a level of 356 divisions. Similarly, for the lowest energy range, 0–0.5 MeV, the photopeak has to be centered at an even higher relative energy level compared with the other ranges. In practicing the technique of the invention, the highest energy range is calibrated first, then the photopeak is moved further up the relative energy scale by increasing the gain of the instrument to calibrate successively lower absolute energy ranges.

The upper and lower discriminator limits for channel 1 and channel 2 are given in the table 114, adjacent block 112, for each of the three energy ranges calibrated in accordance with this example. For the 2 MeV range, which would be calibrated first, channel 1 is set to have its lower discriminator limit at 112 divisions and its upper discriminator limit at 178 divisions while channel 2 is set to have its lower discriminator limit at 178 divisions and its upper discriminator limit at 1000 divisions. By measuring the gamma ray count in each of these windows, it is possible to obtain, from a ratio of the counts in the two channels, an indication of the relative position of the photopeak with respect to the desired relative energy position, in this case, 178 divisions on the horizontal scale. For this determination, the counting time is set to 0.05 minutes, as shown in block 116, and the counts are recorded for this time, after incrementing the voltage setting by thirty-two, as shown in block 118. The question is then asked, as shown in block 120, whether the ratio of the number of counts recorded in channel 1 to the number of counts recorded in channel 2 is less than some preselected value, in this case the integer value two. This preselected value is arrived at by experience with the particular calibration sample, and is selected so that when the value is reached, the ordinate drawn from the desired relative energy level over which the photopeak is to be centered, intersects the photopeak on the leading or high-energy slope of the photopeak, as shown in FIG. 4b. If the answer to the question posed in block 120 is negative, the steps of block 118 are repeated until the photopeak is in the desired position with respect to the horizontal scale. With this form of coarse adjustment, as effected by blocks 118 and 120, it is possible to overshoot the desired goal of the coarse adjustment. Accordingly, as shown in block 122, reached through connector A, the voltage setting is then either incremented or decremented by an amount equal to half of the previous increment or decrement, and a reading is again taken to converge on the desired channel count ratio. This process is continued until the voltage setting increment if reduced to one, as indicated in the question posed in block 124.

When the coarse adjustment has been completed in accordance with the foregoing steps, the channel 1 window is reset to define a relatively narrow range spaced above and below the desired relative energy setting at which the photopeak is to be centered. This is indicated in block 126 and the adjacent table 127. For the 0-2.0 MeV range, for example, the channel 1 window is set with its lower discriminator limit at 175 divisions and its upper discriminator limit at 181 divisions, as shown in FIG. 4c. The range selected is not a critical one, but it will be appreciated that the selection involves a trade-off between resolution and efficiency. A very narrow window will give better resolution of the peak, but will require more time for the accumulation of a sufficient number of counts. The counting time in the example given is set to 0.10 minute, as shown in block 128, to begin the step of fine adjustment of the instrument gain.

Basically, this fine adjustment process includes incrementing or decrementing the voltage setting by one, taking a count for the counting time previously set, as indicated in block 130, and then checking to determine whether the count has reached a maximum value, as indicated in block 132. If the count is not a maximum, return is made to block 130 to readjust the voltage setting and take a further count. FIG. 4d shows the photopeak centered over the desired relative energy setting, and FIG. 4e shows the photopeak advanced too far beyond the desired relative energy setting. When the channel 1 count is maximized, the voltage setting is stored, as indicated in block 134, and the question is asked, in block 136, whether any more energy ranges are to be calibrated. If the answer is affirmative, transfer is made, through connector B, to block 112, to begin a further coarse adjustment for the next energy range for which calibration is to be performed. If no more energy ranges remain to be calibrated, exit is made from this sequence, as shown by the exit block 138.

It will be appreciated from the foregoing that, after the steps described in FIG. 5 have been performed for each of the energy ranges to be calibrated, the storage element 62 (FIG. 1) will contain a voltage setting for each of the desired absolute energy ranges. It will also be apparent that the same technique could be employed to adjust the attenuator ranges rather than the high voltage applied to the multiplier phototube, or to adjust a combination of attenuator range and high voltage. Once all of these settings have been stored, it is a simple matter to retrieve them individually when a particular absolute energy range is required to be used for a particular test measurement. Thus, the instrument can be calibrated to read accurately over a number of desired absolute energy ranges, with each calibration being independent of the others, and being available for reapplication as the need arises. Although the invention has been described in relation to the particular embodiment illustrated by way of example, it will be appreciated that various modifications may be made without departing from the spirit and scope of the invention. Accordingly, the invention is not to be limited except as by the appended claims.

We claim:

1. A method of calibration of a gamma counter having a detector and multiplier phototube means for the detection of gamma radiation, said method comprising the steps of:
    placing a calibration source in an operative relationship with the detector, the calibration source being an emitter of gamma rays at a known energy level;
    adjusting a setting of overall signal gain provided by the multiplier phototube means until pulses output therefrom have a pulse height which bears the same ratio to a maximum detectable pulse height as the known energy level bears to a desired maximum detectable energy level;
    storing the setting obtained at the conclusion of said adjusting step; and
    repeating said adjusting and storing steps for other desired maximum detectable energy levels, whereby each setting so obtained and stored may be retrieved and reapplied to select any of a plurality of desired detectable energy ranges.

2. A method as set forth in claim 1, wherein said adjusting step includes varying the magnitude of a voltage supplied to the multiplier phototube means.

3. A method as set forth in claim 1, wherein:
    the multiplier phototube means includes adjustable signal attenuator means; and
    said adjusting step includes varying the gain of the adjustable signal attenuator means.

4. A method as set forth in claim 1, wherein said adjusting step includes:

determining a desired relative pulse height for pulses of the known energy level, by multiplying the maximum detectable pulse height by the ratio of the known energy level to the desired maximum detectable energy level;

setting the overall signal gain of the multiplier phototube means to a minimum value; and varying the overall signal gain of the multiplier phototube until a photopeak resulting from emissions at the known energy level is centered at the desired relative pulse height.

5. A method as set forth in claim 4, wherein said step of varying the overall signal gain includes:

making an initial coarse adjustment to the overall signal gain until the photopeak is positioned relatively close to the desired relative pulse height and on the lower energy side thereof; and making a subsequent fine adjustment to the overall signal gain to center the photopeak over the desired relative pulse height.

6. A method as set forth in claim 5, wherein said step of making an initial coarse adjustment to the overall signal gain includes:

selecting a first counting channel to count pulses having a height up to the desired relative pulse height and down to a relatively low relative pulse height;

selecting a second counting channel to count pulses having a height between the desired relative pulse height and a relatively high relative pulse height;

counting in the first and second counting channels;

determining the ratio of the counting rate in one channel to the counting rate in the other channel; and adjusting the overall signal gain until the ratio thus determined reaches a preselected magnitude.

7. A method as set forth in claim 6, wherein said step of making an initial coarse adjustment to the overall signal gain further includes the preliminary steps of:

selecting a single counting channel to count all detectable pulses from zero pulse height to the maximum detectable pulse height;

counting pulses in this single channel; and adjusting the overall signal gain until a preselected minimum counting rate is attained.

8. A method as set forth in claim 5, wherein said step of making a subsequent fine adjustment to the overall signal gain includes:

setting a single counting channel to count pulses in a relatively narrow range with limits spaced equidistantly above and below the desired relative pulse height;

counting in the selected counting channel; and adjusting the overall signal gain by relatively small increments until the counting rate recorded in the selected counting channel is maximized, thereby centering the photopeak over the desired relative pulse height.

9. For use with a gamma ray counting instrument having a gamma radiation detector and a multiplier phototube, apparatus for calibrating the instrument over a plurality of desired absolute energy ranges, said apparatus comprising:

means for placing a calibration source in an operative relationship with the detector, the calibration source being an emitter of gamma rays at a known energy level;

means for adjusting the voltage supplied to power the multiplier phototube, and thereby adjusting the overall signal gain until pulses output therefrom have a pulse height which bears the same ratio to a maximum detectable pulse height as the known energy level bears to a desired maximum detectable energy level;

means for storing a voltage-related setting obtained from said means for adjusting the voltage supplied to power the multiplier phototube; and means for retrieving and reapplying the voltage-related setting in order to utilize the calibrated instrument over any of a plurality of desired absolute energy ranges.

10. Apparatus as set forth in claim 9, and further including adjustable attenuator means coupled to receive and attenuate pulses output from the multiplier phototube, whereby said adjustable attenuator means may also be adjusted to calibrate the instrument.

* * * * *